Aug. 3, 1965 H. E. TAYLOR 3,197,946

COALESCER FOR A MOISTURE SEPARATOR

Filed Nov. 25, 1960

INVENTOR
HERBERT E. TAYLOR
BY Leonard F. Wahlind
ATTORNEY 3,197,946

COALESCER FOR A MOISTURE SEPARATOR

Herbert E. Taylor, Longmeadow, Mass., assignor to United Aircraft Corporation, East Hartford, Conn., a corporation of Delaware Filed Nov. 25, 1960, Ser. No. 71,605
9 Claims. (Cl. 55—527)

This invention relates to water separators and constitutes an improvement over the water separator described in United States Patent No. 2,835,340, granted to McGuff et al. on May 20, 1958.

An object of this invention is to provide, for a water separator device, an improved water repellent material which is characterized as having small diameter fibers in the order of less than 10 microns which exhibit a high degree of ability to coalesce moisture entrained in a moving airstream.

A still further object is a device combining a fabric coalescer for transforming moisture from a moving airstream into small drops and a collector forming the small drops from a moving airstream into larger ones which may be assembled into a drain before they are carried on.

These and other objects of this invention will become readily apparent from the following detailed description of the drawings in which.

Figures 1, 2, 3, 4:
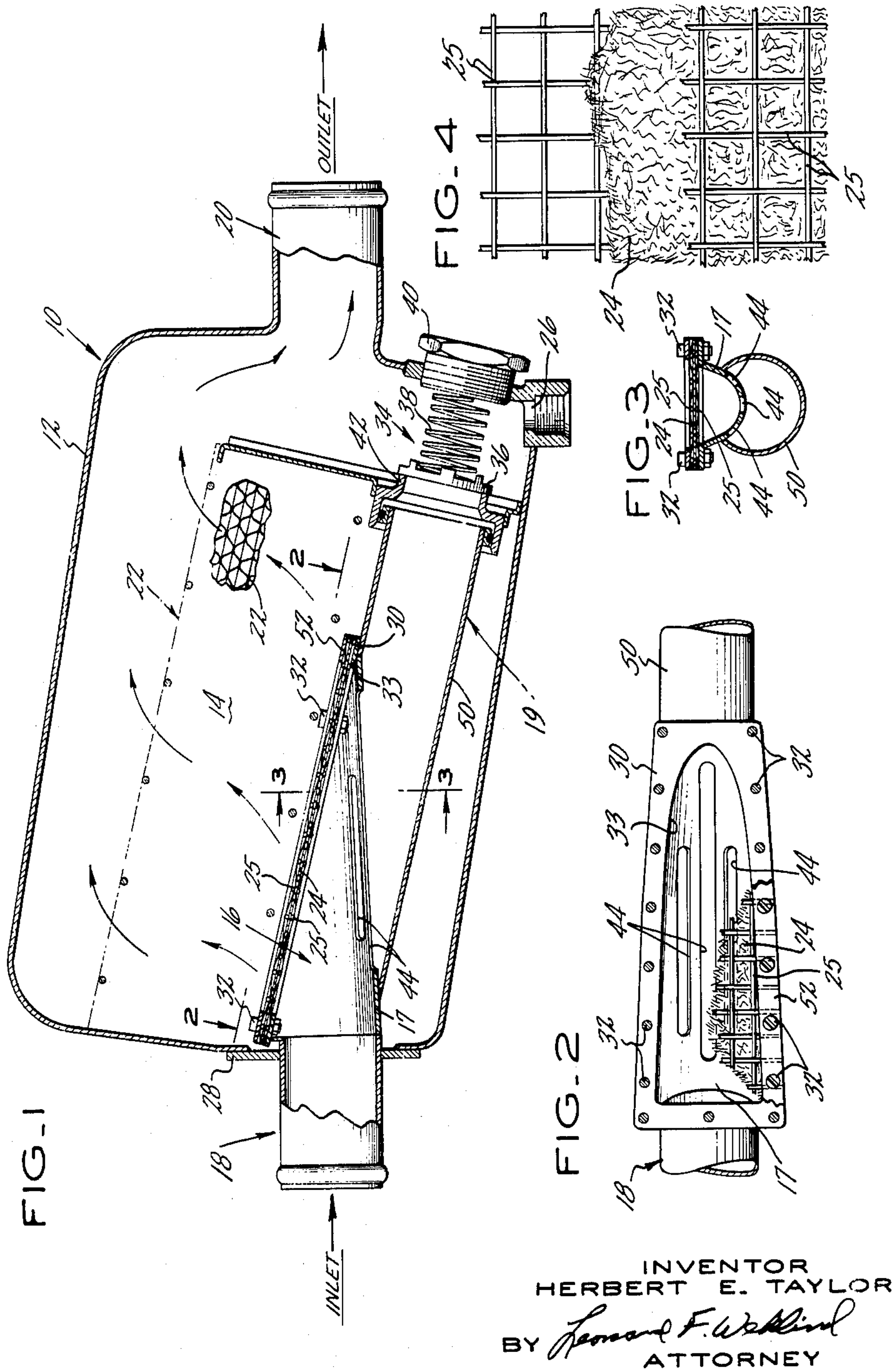
FIG. 1 is a side elevation partly in section of the assembled water separator.
FIG. 2 is an elevated top view showing the details of the coalescer and taken along line 2—2 of FIG. 1.
FIG. 3 is a sectional view taken along line 3—3 of FIG. 1.
FIG. 4 is an enlarged fragmentary view showing the details of the coalescing material.

In air conditioning systems utilized for controlling the environment within an aircraft and particularly of the air cycle type, bleed air taken from the power plant in normal practice is passed through a refrigeration unit such as the turbo-compressor type and then directed to the compartment or the cabin intended to be cooled for maintaining proper environmental conditions. In these types of systems, particularly where the air evidences an adiabatic expansion in driving the turbine, the partial pressure of the moisture which is contained in the air stream decreases such that the moisture is separated from, but carried with the airstream in the form of fog or mist and consisting of many fine particles of moisture. Unless the moisture is removed from the airstream, these particles will discharge into the cabin creating a foggy or misty atmosphere or on occasions, these particles could freeze into ice which would be carried into the cabin. To eliminate this undesirable condition, it is a well-known expedient to provide a suitable water or moisture separator. Since the water separator is the primary concern of this invention, for convenience, the details of a suitable air conditioning system have been eliminated. However, for further details of a suitable system, reference should be made to United States Patent No. 2,835,340 supra.

Since the advent of high speed aircraft, an enormous quantity of heat is generated in the cabin which may be due to the frictional effect caused by the aircraft flying through air, the electronic equipment, etc. requiring a complementary environmental control system for dissipating this undesirable heat. To meet these demanding requirements, environmental control systems having large cooling capacities are essential which necessitate the need of efficient moisture or water separators. Although the water separator disclosed in United States Patent No. 2,835,340 supra satisfies requirements of certain aircraft, it has not been able to meet the needed requirements for air conditioning systems in other aircraft. The invention which I provide, however, constitutes an improvement over the above-mentioned water separator and evidences superior capabilities for solving the particular water separating problems attendant these new aircraft.

The purpose of the water collector is to remove the water particles which are entrained in the cool airstream discharging from the turbine and deliver the air free of substantially all of its entrained moisture to the cabin. Because of the finite moisture particles which may be in the order of less than 5 microns, the collector of heretofore known designs would allow a large percentage of the moisture to "carry over" or inject into the cabin and thus fail to fully meet the necessary environmental condition requirements. To aid in collecting the moisture, a coalescer is generally employed and serves to gather these finite moisture particles and agglomerate them into larger particles so that the collector may perform its operation effectively and thus prevent water carry over.

In the past, it has generally been an accepted theory that the efficiency of coalescing was dependent on the pressure drop which the coalescer exhibited. By these parameters, i.e. efficiency and pressure drop and in accordance with this theory, it would follow that the material to be satisfactory should have sufficient density to provide the proper pressure drop for obtaining the necessary efficiency. In the past a woven nylon napped fabric proved adequate as a coalescing material. In line with this theory, then, one would normally expect to obtain a higher efficiency by selecting fabrics having sufficiently high density so as to produce a high pressure drop. Thus the material selected was usually a compromise between efficiency and pressure drop such that the pressure drop would not be too high so as to interfere with the overall efficiency of the air conditioning system.

I have found, contrary to these accepted practices and theories, that I can obtain superior coalescing efficiencies from fabric having very low fiber content, i.e. having a relatively low density, and the results obtained from tested samples have proven to be unusual from what one would normally expect to obtain. The fabric which has shown superior performance is characterized as having a low wettability quality and made of fibers having diameters in the order of less than 10 microns.

Referring now particularly to FIGS. 1, 2, and 3, the water separator is generally indicated by numeral 10 and comprises an outer casing 12, a collector 14, a coalescer assembly 16, and a bypass system 19. The water separator is usually disposed in an air conditioning system at a point just downstream of the turbine and may be connected to the system ducting members by the elongated tubing member 18 and the elongated tubing member 20. The tubing member 18 forms the inlet to the moisture separator and tubing member 20 forms the outlet. The collector 14 is formed of a knitted wire mesh fabric of a corrosion resistant material such as stainless steel or aluminum wire 22. For further details of an air conditioning system and of a suitable collector, reference should be made to Patent No. 2,835,340 supra.

Moisture laden air leaving the turbine is admitted into the water separator through tube 18, passes upwardly through the coalescing material 24 which gathers the fine water particles and combines them into drops of water which are then carried by the airstream into the water collector. The water collector serves to catch these drops and prevent them from passing therethrough. The collected droplets are then caused by gravity to drop toward the bottom of casing 12 which is mounted inclined to the horizontal and then follows along the walls of the casing and there collected at the far right corner and vented out of the system through opening 26. The coalescer comprises an elongated tubular casing forming the coalescer support member which is cut along a bias at its end located within the water separator casing so as to form a flat surface for permitting the air to pass freely, i.e. at a minimum pressure drop into the collector. The coalescer may be welded in in-line relation to tubing 18 and is located in proximity to the collector 14 by flange 28 which holds the coalescer and tube 18 assembly in place by being welded to the outside surface of casing 12.

The coalescing material which I have found to be satisfactory is a porous, loosely matted fabric made from water repellent fibers whose diameters are substantially equal to 4 microns. Synthetic fibers of the polytetrafluoroethylene polymer and manufactured by E. I. du Pont de Nemours and Company under the trade name of "Teflon" or "Armalon" have proven satisfactory. The fabric is formed by matting an array of long staple fibers into a sheet which measures approximately 1/16 inch thick. I have found that the density of a suitable coalescing material may equal .0045 pound per cubic inch. Such a fabric should exhibit a high degree of air permeability. In ascertaining the value of the air permeability, it is a well-known expedient to measure the corrected weight flow and compare this value with the pressure drop ratio, i.e. the pressure drop measured across the material ratioed to the upstream pressure. For a further understanding of the characteristics of fluid flow, reference is made to the text book entitled The Dynamics and Thermodynamics of Compressible Fluid Flow, by Ascher H. Shapiro, published by the Ronald Press Company, 1953.

To obtain a high degree of coalescing efficiency, the permeability effect should fall into a predetermined range, and this range can be obtained by plotting the pressure drop ratio versus the corrected weight flow. I have found that by plotting a curve with these parameters on standard log-log paper, the pressure drop ratio corresponding to corrected weight flow ranging from $$0.1\frac{\frac{\text{pounds of dry air}}{\text{minute}}\times{}^{\circ}R}{\text{inch}^2\ \text{p.s.i.a.}}\ \text{to}\ 10\frac{\frac{\text{pounds of dry air}}{\text{minute}}\times{}^{\circ}R}{\text{inch}^2\ \text{p.s.i.a.}}$$

will range in substantially linear fashion where R is temperature in degrees Rankine and p.s.i.a. is absolute pressure in pounds per square inch. And for a value of 0.1 corrected weight flow, the value of the pressure drop ratio will be substantially equal to 0.01 and at a corrected weight flow value of 3.2 the value of the pressure drop ratio is equal to 0.1. This permeability characteristic is achieved by the material described above, but it is to be understood that other material may be utilized so long as it has the other mentioned coalescing characteristics.

The fabric may be sandwiched between a pair of screens 25 which may be made of the same noncorrosive material as the collector and is sewn into place as is shown in FIG. 4. Depending on the rigidity desired, one screen may be utilized instead of the two as shown. The screen and fabric forming the coalescer material are then mounted on to the coalescer support and span the opening 33 formed in coalescer assembly 16. The coalescer material overlies platform 30 which is secured to the coalescer support 17 and is coplanar with the plane formed by the bias cut along the coalescer. A cooperating restraining member 52 having an aperture conforming to the same shape as opening 33 is mounted over the coalescer material and may conform in shape to platform member 30. A plurality of aligning openings are disposed along the outer periphery of members 30 and 52 for receiving a plurality of nut and bolt assemblies 32 for securing the coalescer material to the coalescing support. The interstices of the screen material are made such that the staple of the fibers which may measure approximately 5–6 inches are restrained from separating from the matting.

In the event that the water separator, i.e. the collector or coalescer freezes, a bypass valve is provided which is generally indicated by numeral 34. The bypass valve carried on the end of elongated tubing 50 comprises movable valve element 36, spring 38, and adjusting nut 40 which serves to adjust the compression of the spring. Thus as the pressure of the air exceeds a predetermined value and overcomes the force exerted by spring 38, valve element 36 unseats away from the seat member 42 allowing the airstream to pass into the discharge tubing 20. As will be noted, elongated slots 44 are cut into the bottom portion of the coalescer support 17 to provide communication with the inlet airstream and the bypass valve. It will be understood that the bypass valve pressure relief valve may be replaced by any of the well known manual or power operated valves for causing the airstream to bypass the coalescer material and collector as desired.

In summary, the airstream entrained with finite moisture particles enters the water separator and first passes through the coalescer 24 which serves to gather these particles to form larger water droplets. These droplets are then carried into the wire mesh which serves to collect the droplets and yet allows the residual air, substantially free of entrained moisture, to discharge into the compartment or cabin of the aircraft. The water droplets fall to the bottom of the water collector which serves as a collecting basin and directs the collected water to a vent so as to be discharged out of the system.

What has been described is an improved water separator that utilizes a fabric having good water repellent characteristics and felted from fibers having diameters in the order of less than 10 microns and evidences a high degree of air permeability. The coalescer is located in juxtaposed position to the collector for improving the pressure drop characteristics of the airstream and reducing the overall weight and envelope size of the water separator. Although the description has been specifically directed to the details of a water separator utilized in an aircraft air conditioning system which reduces temperature by a turbo-compressor unit, one skilled in the art will recognize that such a device has numerous applications wherein the object is to separate moisture from a gaseous mixture.

It is to be understood that the invention is not limited to the specific embodiment herein illustrated and described, but may be used in other ways without departing from its spirit as defined by the following claims.

I claim:

1. A coalescer having a high permeable material formed from an array of long staple tetrafluoroethylene fibers horizontally arranged in sheet form, said fibers being substantially equal to 4 microns in diameter, and the density of said material being equal to .0045 pound per cubic inch.

2. A coalescing material comprising a substantially porous nonwoven fabric made from a long staple tetrafluoroethylene fiber arranged in sheet form measuring substantially one sixteenth of an inch in thickness and having fiber diameters equal to less than 10 microns, said fabric having a density equal to substantially .0045 pound per cubic inch.

3. The process for separating water from an airstream having relatively small water particles suspended therein comprising the steps of coalescing the water particles by passing all of the combined water particles and air through a nonwoven porous fabric formed from tetrafluoroethylene fibers having diameters equal to less than ten microns, filtering the water particles coalesced from the airstream, collecting the said water particles and advancing the filtrate in a direction away from the said collected water particles.

4. The process for separating water from an airstream having fine water droplets suspended therein comprising the steps of coalescing the fine water droplets by passing all of the airstream with the suspended water droplets through a nonwoven fabric formed from a sheet of horizontally randomly distributed tetrafluoroethylene fibers having diameters equal to less than ten microns and the density of the sheet substantially equal to .0045 pound per cubic inch.

5. The process for coalescing fine moisture particles in an airstream without the removal of the particles of the airstream comprising passing the airstream with the moisture particles through a matted fabric formed from tetrafluoroethylene fibers having diameters measuring less than ten microns.

6. The process for coalescing fine moisture particles suspended in an airstream without the removal of the particles of the airstream comprising passing the airstream with the suspended moisture particles through a nonwoven matted fabric formed from randomly distributed tetrafluoroethylene fibers having diameters measuring less than ten microns.

7. The process for coalescing fine water droplets dispersed in an airstream without the removal of the water droplets from the airstream comprising the step of passing the airstream with the dispersed water droplets through a nonwoven matted fabric formed from randomly distributed tetrafluoroethylene fibers horizontally arranged in sheet form having a density equal to substantially .0045 pound per cubic inch.

8. In combination, in an air and liquid separator, a duct, a water separator having an outer casing including an inlet opening receiving one end of said duct for receiving a moisture laden airstream, a coalescer having a hollow cylindrically shaped member located within the casing and disposed in the path of the airstream, said hollow cylindrical member having one end cut along a bias relative to the longitudinal axis thereof, said end defining an elongated planar surface, a sheet of porous material overlying said planar surface, said material formed by a matted array of tetrafluoroethylene fibers, a collector formed from an open wire mesh mounted in and arranged across the casing and located in juxtaposed relation to the coalescer, a conduit in said casing connected to said hollow cylindrical member, bypass valve means mounted on one end of said conduit, and openings in said hollow member interconnecting said duct and said bypass valve means for bypassing said porous material.

9. In combination, in an air and liquid separator, a duct, a water separator having an outer casing including an inlet opening attached to one end of said duct for receiving a moisture laden airstream, a coalescer having a hollow cylindrically shaped member located within the casing and disposed in the path of the airstream, one end of said cylindrically shaped member cut angularly relative to the longitudinal axis thereof and defining an elongated planar surface, a porous sheet material overlying the opening adjacent said surface, said material formed from a matted array of tetrafluoroethylene fibers, a collector formed from an open wire mesh mounted in and arranged across the casing and located in juxtaposed relation to the porous sheet material.

References Cited by the Examiner

UNITED STATES PATENTS

| | | | |
|---|---|---|---|
| 1,379,056 | 5/21 | Smith | 55—21 |
| 2,144,681 | 1/39 | Kraissl | 183—47 |
| 2,521,785 | 9/50 | Goodloe | 183—70 |
| 2,764,506 | 9/56 | Piccard | 183—45 |
| 2,823,760 | 2/58 | Anderson | 55—500 X |
| 2,835,340 | 5/58 | McGuff et al. | 183—69 |
| 2,933,154 | 4/60 | Lauterback | 183—45 |
| 3,022,859 | 2/62 | Sexton | 55—524 X |

FOREIGN PATENTS

| | | |
|---|---|---|
| 221,611 | 5/59 | Australia. |

JULIUS GREENWALD, *Primary Examiner.*

WALTER M. BERLOWITZ, ALBERT T. MEYERS, *Examiners.*